United States Patent Office 3,058,917
Patented Oct. 16, 1962

3,058,917
LIQUID DISHWASHING DETERGENT
Anthony E. Lintner, Castle Shannon, Pa., assignor to Hagan Chemicals & Controls, Inc., a corporation of Pennsylvania
No Drawing. Filed July 28, 1959, Ser. No. 829,990
8 Claims. (Cl. 252—99)

There has long been a need and a demand for a liquid chlorinated dishwashing compound. The advantages of such a compound are many and well recognized. Such a liquid agent would be easily metered and added to a dishwashing apparatus. The solution problems common to solid and powdered dishwashing agents would be eliminated. The washing action would start immediately without any need for delay in solution. However, even with these known advantages and a pressing demand there has never, to my knowledge, been proposed a satisfactory liquid, built, chlorinated mechanical dishwashing agent.

The problems of producing such an agent are many and prior to the instant invention have not been solved. One of the primary problems is that of providing a chlorine source for such a liquid mechanical dishwashing compound. The most likely source of chlorine is sodium hypochlorite, however, one of the very real difficulties confronting a worker attempting to create a hypochlorite-based agent is the problem of stabilizing the chlorine; that is, although the chlorine must be sufficiently dissociated from its molecule to carry on its work of cleaning yet it must be kept from escaping during storage or immediately on application. In addition, chlorine's corrosive tendencies and destructive action on china patterns and metals must also be inhibited.

A second and related problem was that the builders used in the dishwashing compound must be kept in solution and not allowed to hydrolyze. It was generally accepted prior to the present invention that the sequestering phosphates, other than tetrapotassium pyrophosphate, could not be used because of their tendency to revert and salt out from their aqueous solutions. These phosphates tend to reduce the pH value of their aqueous solutions due to hydrolysis; the resulting lower pH endangers the stability of the hypochlorite solution because of the tendency to form the weak acid HOCl from which chlorine readily escapes. On the other hand, the cleaning and sequestering powers of tetrapotassium pyrophosphate are limited and not sufficient to be commercially satisfactory; further, its solubility in practice is not as high as might be expected. As a result, it alone has not been satisfactory.

The corrosivity problem created by the chlorine was the source of a secondary problem, i.e., finding an inhibitor. An inhibitor which will not salt out and is at the same time a builder while still allowing the chlorine to remain available is necessary. This is an important problem on two counts, one commercial and the other practical.

An important commercial property of any cleaning material is its appearance. Generally speaking, in a liquid detergent, clarity is preferred to cloudiness. Precipitation, in addition to lowering the efficiency of a detergent, lowers its sales appeal. On the other hand, liquids are easily dispensed into dishwashers and the like; however, to avoid plugging the feeding system, they must be entirely free of solids.

I have found that the above desirable characteristics can be enjoyed and the undesirable traits eliminated or inhibited by the use of my invention, hereinafter more fully described. In addition, my compound has another desirable characteristic in the ability of the detergent to work at temperatures lower than normally used in commercial dishwashing machines, thus making possible large savings in fuel.

I have discovered that a composition having the following broad limits will produce the surprising properties and characteristics set out herein:

| | Parts |
|---|---|
| Alkali metal hypochlorite | .5–3.5 |
| A phosphate selected from the group consisting of tetrapotassium pyrophosphate ($K_4P_2O_7$), tetrasodium pyrophosphate ($Na_4P_2O_7$), sodium tripolyphosphate ($Na_5P_3O_{10}$), potassium tripolyphosphate ($K_5P_3O_{10}$) and mixtures thereof | 5–20 |
| Tripotassium orthophosphate ($K_3PO_4$) | 10–30 |
| Alkali metal metasilicate | 2–6 |
| KOH | 0–5 |
| Water to make the desired solution. | |

Preferably the foregoing composition is embodied in the following formulation:

| | Percent |
|---|---|
| NaOCl (or KOCl) | .5–3.5 |
| A phosphate selected from the group consisting of tetrapotassium pyrophosphate ($K_4P_2O_7$), tetrasodium pyrophosphate ($Na_4P_2O_7$), sodium tripolyphosphate ($Na_5P_3O_{10}$) and potassium tripolyphosphate ($K_5P_3O_{10}$) and mixtures thereof | 5–20 |
| Tripotassium orthophosphate ($K_3PO_4$) | 10–30 |
| $K_2SiO_3$ (or $Na_2SiO_3$) | 2–6 |
| KOH | 0–5 |
| Water, balance to make 100%. | |

Preferably, the NaOCl and a major portion of the water is derived from "Clorox" which is 5.25% by weight solution of NaOCl in water, or other similar commercial product.

The $K_2SiO_3$ may be used in the form of "Kasil I" which is a 28° Baumé solution of $K_2SiO_3$ (ratio of $K_2O$—$SiO_2$ of 1:3.92) in water.

A preferred composition according to my invention consists of:

| | Percent by weight |
|---|---|
| "Clorox" | 28 |
| Water | 23 |
| Sodium tripolyphosphate ($Na_5P_3O_{10}$) | 10 |
| Tetrapotassium pyrophosphate ($K_4P_2O_7$) | 3 |
| Tripotassium orthophosphate ($K_3PO_4$) | 22 |
| "Kasil I" (28° Baumé solution of $K_2SiO_3$) | 10 |
| KOH (caustic potash) | 4 |

Potassium tripolyphosphate may be substituted for the sodium tripolyphosphate but the sodium compound is preferred.

Alternatively, however, as a second preferred composition, I provide:

| | Percent by weight |
|---|---|
| "Clorox" | 25.00 |
| Water | 24.50 |
| Potassium tripolyphosphate | 15.00 |
| Tripotassium orthophosphate | 20.00 |
| "Kasil I" | 9.00 |
| Caustic potash | 6.50 |

A third specific composition which I also find extremely effective is:

| | Percent by weight |
|---|---|
| "Clorox" (containing NaOCl) | 50.0 |
| $K_4P_2O_7$ | 9.0 |
| $K_3PO_4$ | 24.0 |
| "Kasil I" (liquid $K_2SiO_3$) | 11.0 |
| KOH | 3.0 |
| Water | 3.0 |

Tetrapotassium pyrophosphate is desirable because of its ability to sequester iron ions, and is particularly desirable where that action is desired. Where iron is not present it may be omitted in favor of one of the other phosphates.

My use of potassium metasilicate is not in any way limited to the ratio and concentration of $K_2O$—$SiO_2$ provided in "Kasil I," however, nor is the potassium (or sodium) metasilicate even necessary at all in my invention. Although it has some effectiveness as a detergent, its primary usefulness is in corrosion inhibition and it need not be added where it is not desired to utilize its tendency to inhibit the corrosive action of the chlorine.

The tripotassium orthophosphate is necessary for its alkalinity and its apparent dispersing properties. It appears to contribute potassium ions to the total composition and appears to aid in holding the molecularly dehydrated tripolyphosphate in a dehydrated state; that is, the molecularly dehydrated tripolyphosphate will not, to any appreciable degree, revert to acid or alkaline orthophosphate and eventually precipitate out, resulting in lowered pH, reduced sequestering power and clogging of the feeding system. While this seems to be the mechanism of operation, I do not wish to be bound by any theory of mechanism. It is clear that there is a profound synergistic action between this orthophosphate, the tripolyphosphates and the pyrophosphates in their effect on the hypochlorites, producing a result not obtainable with either one alone.

Water is not an essential ingredient except as related to the desired liquid form of the composition, and except as related to the preferred method of mixing the composition.

The potassium hydroxide is not essential; however, its presence has been found to improve the chlorine stability, in addition to improving the cleaning ability of the entire mixture, because of its high pH.

Care must be taken in mixing the ingredients that each ingredient is fully dissolved. Under ordinary conditions the sodium tripolyphosphate will not dissolve unless the potassium compounds are added first. The preferred method of mixing the preferred composition is as follows: add to the "Clorox" mixed with water first the potassium orthophosphate, then the potassium pyrophosphate, and finally a mixture of the potassium hydroxide and "Kasil I." This results in a clear liquid free of precipitates.

The composition has been systematically compared and found generally equal in performance with commercially available powdered or granular mechanical dishwashing agents.

While I have shown and described certain preferred variations and compositions, it is to be distinctly understood that the invention is not limited thereto but may be otherwise variously embodied within the scope of the following claims.

I claim:
1. A liquid detergent for dishwashing consisting essentially of about 1 part to about 3.5 parts by weigh of an alkali metal hypochlorite, about 5 parts to about 20 parts by weight of a compound selected from the group consisting of sodium tripolyphosphate, potassium tripolyphosphate, tetrapotassium pyrophosphate and tetrasodium pyrophosphate and mixtures thereof, about 10 parts to about 30 parts by weight of a compound selected from the group consisting of trisodium orthophosphate and tripotassium orthophosphate; about 2 to about 6 parts by weight of a compound selected from the group consisting of sodium metasilicate and potassium metasilicate; up to about 5 parts by weight KOH, and sufficient water to form a solution.

2. A liquid detergent for dishwashing consisting essentially of about 1% to about 3.5% by weight of a material from the group consisting of sodium hypochlorite and potassium hypochlorite, about 5% to about 20% by weight of a compound selected from the group consisting of sodium tripolyphosphate, potassium tripolyphosphate, tetrasodium pyrophosphate, tetrapotassium pyrophosphate and mixtures thereof, about 10% to about 30% by weight of a compound selected from the group consisting of trisodium orthophosphate and tripotassium orthophosphate, about 2% to about 6% by weight of a compound selected from the group consisting of sodium metasilicate and potassium metasilicate, up to about 5% by weight potassium hydroxide and the balance water.

3. A liquid detergent for dishwashing consisting essentially of about 1% to 3.5% by weight of NaOCl, about 5% to 20% by weight $Na_5P_3O_{10}$, about 10% to 30% by weight $K_3PO_4$, about 2% to 6% by weight $K_2SiO_3$, up to about 5% by weight KOH and the balance water.

4. A liquid detergent for dishwashing consisting essentially of about 28% by weight of a 5.25% solution of NaOCl in water, about 23% by weight water, about 10% by weight $Na_5P_3O_{10}$, about 3% by weight $K_4P_2O_7$, about 22% by weight $K_3PO_4$, about 10% by weight of a 28° Baumé solution of $K_2SiO_3$ in water, and about 4% by weight KOH.

5. A liquid detergent for dishwashing consisting essentially of about 25% by weight of a 5.25% solution of NaOCl in water, about 24.5% by weight water, 15% by weight $K_5P_3O_{10}$, about 20% by weight $K_3PO_4$, about 9% by weight of a 28° Baumé solution of $K_2SiO_3$ in water, and about 6.5% by weight KOH.

6. A liquid detergent for dishwashing consisting essentially of about 50% by weight of a 5.25% solution of NaOCl in water, about 9% by weight $K_4P_2O_7$, about 24% by weight $K_3PO_4$, about 11% by weight of a 28° Baumé solution of $K_2SiO_3$ in water, about 3% by weight KOH and about 3% by weight water.

7. A liquid detergent consisting essentially of about 1 part by weight sodium hypochlorite, about 7 parts by weight sodium tripolyphosphate, about 15 parts by weight tripotassium orthophosphate, and about 2 parts by weight potassium metasilicate, in a substantially aqueous medium.

8. The aqueous-based liquid detergent of claim 2 containing about 1 to about 4 parts by weight KOH.

References Cited in the file of this patent
UNITED STATES PATENTS

| | | |
|---|---|---|
| 2,439,784 | Cerna | Apr. 13, 1948 |
| 2,689,225 | Anderson et al. | Sept. 14, 1954 |
| 2,895,916 | Milenkevich et al. | July 21, 1959 |